United States Patent [19]

Ruggiero et al.

[11] Patent Number: 5,355,110
[45] Date of Patent: * Oct. 11, 1994

[54] DUAL ELEMENT FUSE

[75] Inventors: Mary A. Ruggiero, Toronto; Tony Biasutti, Mississauga; Peter Morgan; Brian A. Young, both of Toronto, all of Canada

[73] Assignee: Nor-Am Electrical Limited, Toronto, Canada

[*] Notice: The portion of the term of this patent subsequent to Oct. 19, 2010 has been disclaimed.

[21] Appl. No.: 120,752

[22] Filed: Sep. 15, 1993

Related U.S. Application Data

[63] Continuation-in-part of Ser. No. 994,951, Dec. 22, 1992, Pat. No. 5,254,967.

[30] Foreign Application Priority Data

Oct. 2, 1992 [CA] Canada ............... 2079772

[51] Int. Cl.⁵ .......................... H01H 71/20
[52] U.S. Cl. ........................ 337/165; 337/161
[58] Field of Search ........... 337/165, 163, 164, 166, 337/161, 162

[56] References Cited

U.S. PATENT DOCUMENTS

| | | |
|---|---|---|
| 1,001,698 | 12/1911 | Howard . |
| 1,072,156 | 2/1912 | Blewitt . |
| 1,084,706 | 1/1914 | Murray . |
| 1,155,154 | 10/1915 | Knapp, Jr. . |
| 1,173,087 | 8/1916 | Ross . |
| 1,189,117 | 10/1916 | O'Brien . |
| 1,196,364 | 11/1916 | Barry et al. . |
| 1,196,942 | 11/1916 | Jarosy et al. . |
| 1,200,575 | 12/1916 | Cameron . |
| 1,202,056 | 12/1916 | Gaia . |
| 1,228,102 | 10/1917 | Kowalik et al. . |
| 1,228,885 | 11/1917 | Gaia . |
| 1,235,172 | 11/1917 | Kowalik et al. . |
| 1,250,872 | 12/1917 | Krueger . |
| 1,251,500 | 11/1919 | Cameron . |
| 1,290,374 | 11/1919 | Thwaites . |
| 1,299,132 | 4/1919 | Conant . |
| 1,422,419 | 7/1922 | Conant . |
| 1,422,420 | 7/1922 | Conant . |
| 1,601,726 | 10/1926 | Eustice . |
| 1,857,097 | 5/1932 | Glowacki . |
| 1,857,098 | 5/1932 | Glowacki . |
| 1,919,273 | 7/1933 | Conant . |
| 1,991,876 | 2/1935 | Wood . |

(List continued on next page.)

FOREIGN PATENT DOCUMENTS

| | | |
|---|---|---|
| 1052426 | 4/1979 | Canada . |
| 1096913 | 3/1981 | Canada . |
| 1122247 | 4/1982 | Canada . |
| 1135306 | 11/1982 | Canada . |
| 1143415 | 3/1983 | Canada . |
| 1157499 | 11/1983 | Canada . |
| 1174716 | 9/1984 | Canada . |
| 1266290 | 2/1990 | Canada . |
| 59310 | 4/1891 | Fed. Rep. of Germany . |

Primary Examiner—Lincoln Donovan
Attorney, Agent, or Firm—Riches, McKenzie & Herbert

[57] ABSTRACT

An electrical interruption device is disclosed in which an overcurrent protective device is provided to interrupt electric current flow on a sustained overcurrent current occurring. The overcurrent protective device is characterized by a plunger which is held in tension against the force of a spring by a low temperature solder, and further in which a sleeve of insulating material, such as silicone, is provided about the plunger. Preferably, the overcurrent protective device includes a housing, with the plunger disposed in the housing and having one end extending therefrom to provide electric communication with the remainder of the electric circuit. The sleeve of insulating material preferably being located about the end of the plunger which extends from the housing. On a predetermined condition causing the solder to melt, the plunger is released and under the force of the spring is moved to a position retracted within the sleeve, interrupting the current flow. Advantageously, the overcurrent protective device may be used together with pulverulent arc quenching material. The sleeve acts to isolate the pulverulent arc quenching material from the plunger and prevent its interference with the plunger as it is moved under the force of the spring.

33 Claims, 3 Drawing Sheets

U.S. PATENT DOCUMENTS

| | | |
|---|---|---|
| 2,014,844 | 4/1935 | Spalding et al. . |
| 2,014,845 | 4/1935 | Spalding et al . |
| 2,015,285 | 4/1935 | Ehlmann et al. . |
| 2,017,490 | 10/1935 | Glowacki . |
| 2,029,081 | 2/1936 | Krueger et al. . |
| 2,044,636 | 3/1936 | Douglass . |
| 2,055,115 | 9/1936 | Wood . |
| 2,079,097 | 4/1937 | Wood . |
| 2,300,620 | 11/1942 | Duerkob . |
| 2,321,711 | 6/1943 | Taylor . |
| 2,400,408 | 5/1946 | Haefelinger . |
| 2,543,245 | 2/1951 | Laing . |
| 2,577,531 | 12/1951 | Laing . |
| 2,613,297 | 10/1952 | Laing . |
| 2,640,128 | 5/1953 | Fahnoe et al. . |
| 2,657,294 | 10/1953 | Laing . |
| 2,658,974 | 11/1953 | Kozacka . |
| 2,694,124 | 11/1954 | Laing et al. . |
| 2,703,352 | 3/1955 | Kozacka . |
| 2,720,567 | 11/1955 | Detch . |
| 2,734,111 | 2/1956 | Kozacka . |
| 2,747,257 | 4/1956 | Ashcroft et al. . |
| 2,809,254 | 10/1957 | Edsall . |
| 2,816,988 | 12/1957 | Sugden . |
| 2,826,660 | 3/1958 | Kozacka . |
| 2,833,891 | 4/1958 | Jacobs, Jr. . |
| 2,834,852 | 4/1958 | Swain et al. . |
| 2,913,555 | 11/1959 | McAlister . |
| 2,982,835 | 4/1961 | Kozacka . |
| 3,110,855 | 11/1963 | Chumakov . |
| 3,116,389 | 12/1963 | Withers . |
| 3,144,534 | 8/1964 | Baumbach . |
| 3,206,579 | 9/1965 | Berthel et al. . |
| 3,240,905 | 3/1966 | Kozacka . |
| 3,287,526 | 11/1966 | Brandt . |
| 3,291,941 | 12/1966 | Salzer . |
| 3,319,029 | 5/1967 | Jacobs, Jr. . |
| 3,374,328 | 3/1968 | Cameron . |
| 3,417,357 | 12/1968 | Withers . |
| 3,418,614 | 12/1968 | Krueger . |
| 3,453,580 | 7/1969 | Withers . |
| 3,479,630 | 11/1969 | Kozacka . |
| 3,483,501 | 12/1969 | Kozacka . |
| 3,491,322 | 1/1970 | Kozacka . |
| 3,611,239 | 10/1971 | Kozacka . |
| 3,648,210 | 3/1972 | Kozacka . |
| 3,649,942 | 3/1972 | Plasko . |
| 3,681,731 | 8/1972 | Kozacka . |
| 3,689,995 | 9/1972 | Lerstrup . |
| 3,697,916 | 10/1972 | Belcher et al. . |
| 3,701,069 | 10/1972 | Belcher . |
| 3,863,188 | 1/1975 | Knapp, Jr. . |
| 3,876,966 | 4/1975 | Fister . |
| 3,935,553 | 1/1976 | Kozacka et al. . |
| 3,938,067 | 2/1976 | Fister . |
| 4,020,441 | 4/1977 | Jacobs, Jr. . |
| 4,032,877 | 6/1977 | McAlister . |
| 4,041,435 | 8/1977 | Gaia . |
| 4,048,610 | 9/1977 | Jacobs, Jr. . |
| 4,053,860 | 10/1977 | Kozacka et al. . |
| 4,053,862 | 10/1977 | Csizy et al. . |
| 4,055,827 | 10/1977 | Knapp, Jr. . |
| 4,058,786 | 11/1977 | Gaia et al. . |
| 4,101,860 | 7/1978 | Fister . |
| 4,117,441 | 9/1978 | Wycklendt . |
| 4,118,684 | 10/1978 | Mollenhoff . |
| 4,146,863 | 3/1979 | Mollenhoff . |
| 4,184,137 | 1/1980 | Gaia et al. . |
| 4,204,184 | 5/1980 | Csizy et al. . |
| 4,210,892 | 7/1980 | Salzer . |
| 4,216,457 | 8/1980 | Panaro . |
| 4,219,795 | 9/1980 | Panaro et al. . |
| 4,227,167 | 10/1980 | Kozacka et al. . |
| 4,227,168 | 10/1980 | Knapp, Jr. . |
| 4,308,515 | 12/1981 | Rooney et al. . |
| 4,315,235 | 2/1982 | Jacobs, Jr. . |
| 4,321,574 | 3/1982 | Pertici . |
| 4,331,947 | 5/1982 | Noerholm . |
| 4,344,058 | 8/1982 | Knapp, Jr. et al. . |
| 4,349,802 | 9/1982 | Gaia . |
| 4,357,588 | 11/1982 | Leach et al. . |
| 4,359,708 | 11/1982 | Jarosz et al. . |
| 4,367,451 | 1/1983 | Panaro . |
| 4,414,526 | 11/1983 | Panaro . |
| 4,417,224 | 11/1983 | Ross . |
| 4,481,495 | 11/1984 | Jarosz et al. . |
| 4,488,137 | 12/1984 | Rooney et al. . |
| 4,503,415 | 3/1985 | Rooney et al. . |
| 4,511,874 | 4/1985 | Rasmussen et al. . |
| 4,533,895 | 8/1985 | Kowalik et al. . |
| 4,562,420 | 12/1985 | Kowalik et al. . |
| 4,593,262 | 6/1986 | Krueger . |
| 4,611,192 | 9/1986 | Arora . |
| 4,625,195 | 11/1986 | Robbins . |
| 4,636,765 | 1/1987 | Krueger . |
| 4,651,119 | 3/1987 | Belcher et al. . |
| 4,654,620 | 3/1987 | Rooney et al. . |
| 4,782,317 | 11/1988 | Thwaites . |
| 4,935,716 | 6/1990 | Ehlmann . |
| 4,972,170 | 11/1990 | Ehlmann . |
| 4,973,932 | 11/1990 | Krueger et al. . |
| 4,992,770 | 2/1991 | Spalding et al. . |
| 4,994,779 | 2/1991 | Douglass . |
| 5,043,689 | 8/1991 | Di Troia et al. . |
| 5,055,817 | 10/1991 | O'Shields et al. . |
| 5,075,664 | 12/1991 | Spalding et al. . |
| 5,077,534 | 12/1991 | Douglass . |
| 5,091,712 | 2/1992 | Suuronen . |
| 5,148,140 | 9/1992 | Goldstein . |

DUAL ELEMENT FUSE

SCOPE OF THE INVENTION

This application is a continuation-in-part of U.S. patent application Ser. No. 07/994,951, filed Dec. 22, 1992, now U.S. Pat. No. 5,254,967. This invention relates to electrical interruption devices and more particularly to an electrical fuse which is designed to de-energize an electric circuit after either a predetermined interval of a sustained overload current, or almost immediately under a given high over current, as for example occurs during short circuit conditions.

BACKGROUND OF THE INVENTION

Fuses for protecting electrical circuits are well known. Typically known fuses include an insulating tube or casing which may be made of non-conductive material, such as glass, ceramic or the like. Each of the opposite ends of the tube are closed by a pair of electrically conductive end terminals. An electrically conductive element is provided within the tube, connecting each of the terminals to allow the current to pass therebetween.

In a conventional short circuit fuse, the conductive element is provided with one or more constrictions which overheat and melt almost immediately during a time of a short circuit, producing a high peak reverse voltage. Conventional fuses are disadvantageous in that the gap formed by the melting of the metal at the constriction during overloads may not be sufficiently large to eliminate the arcing of current thereacross.

In prior art dual element fuses, such as time delay or thermally sensitive fuses, an overload protection device is provided within the tube serially connected with the electric conductive element. The simplest type of overload protection device comprises a metal spring held in tension within the fuse with one end secured to a first end terminal, and the other opposite end connected by a heat meltable solder to an end of the electric conductive element. Under prolonged overload conditions, heat generated by the current flow, heats the solder to a temperature where it melts allowing the spring to pull away from the conductive element by its collapse. The collapse of the spring away from the electric conductive element produces a sufficient gap in the current path to break the electric circuit.

A second type of known overload protection device is formed as a preassembly of various parts, which is inserted in series with the conductive element. Known preassemblies typically include a cylindrical housing having disposed therein a plunger in a biased relationship with a compressed or extended helical spring. The plunger extends through and beyond one end of the housing to engage the conductive element. The spring provides a force against the plunger member in a direction away from the conductive element, toward re-entry into the housing. A meltable solder joint is used to electrically connect the end of the plunger to the electric conductive element, thereby preventing the return of the plunger into the housing under the force of the spring.

Upon prolonged overload conditions within the protective circuit, heat generated by a sustained overload current flow through the preassembly and electric conductive element causes the solder joint to melt. Once the solder melts, the plunger member is drawn away from the electric conductive element under the force of the untensioning spring.

One disadvantage of most known overload protection devices is that when positioned within a fuse with filler material, the filler material must be kept from interfering with the operation of the protection device. Typically, this is accomplished by providing dividers to separate the overload protection devices as by forming a separate chamber.

Another disadvantage with fuses incorporating most known overload protection devices is that they are comparatively large, and are therefore unsuitable for use in smaller electrical circuits and the like.

In many fuse applications, the fuse must be of a particular exterior dimension. The fuses contain a number of components to be received within the fuse, frequently in axial alignment. A disadvantage of many fuses is that their individual components are too large to permit advantageous spacing of the components or the inclusion of additional components. In particular, comparatively large sizing of known fuses is required to ensure that on overload activation of the fuse there is provided a sufficient gap in the current path to eliminate arcing of current between the overload protective device and the conductive element. The fuse must be manufactured at least as long as the length of the gap required to break the flow of electricity taken together with the length of the helical spring when compressed.

A further factor attributing to the large size of know time delay fuses is that comparatively large springs are used to ensure there is sufficient force to rapidly and fully move the plunger away from the conductive element on melting of the solder joint.

SUMMARY OF THE INVENTION

Accordingly, it is an object of the invention to at least partially overcome the disadvantages of known prior art fuses by providing a fuse for either short circuit or overload protection which incorporates an electrical interruption device in which a space efficient spiral spring activates current interruption.

It is a further object of the invention to provide an overload protection device which incorporates in a preassembly, a relatively small spring which exerts a similar or greater force against a plunger as a conventional compressed or extended helical spring having a greater length.

It is another object of the invention to provide a fuse which incorporates an overload protection device and which does not require a separate chamber to keep filler material from interfering with the operation of the protection device.

The electrical interruption device of the present invention comprises a spiral spring having coils which wind continuously about and constantly approaching a central axis. The successive coils of the spring have sufficiently reduced radius to pass axially through the center of immediately outward adjacent coils. The spring comprises a large diameter first end coil which spirals inwardly to a relatively small diameter second other end coil. The curvature of spiral of the coils being such that the spring may assume a flat condition with the coils lying coplanar, nesting interposed between adjacent coils. Preferably, when unbiased the coils of spiral spring have an inherent tendency to assume either a flattened position where the first end coil is axially aligned with the second end coil or a generally conical position where the first end coil is axially spaced from the second end coil.

Preferably, the spiral coil spring for use with the present invention is a conical spring which is reverse loaded. By reverse loaded it is meant that one end portion of the spring is moved inwardly and pulled through and past the second other end portion.

In a preferred embodiment, the present invention provides circuit protection device for interrupting an electric current. The protection device comprises, a spiral spring held in tension extended in a first direction by a meltable junction, wherein under a predetermined current/time condition, the meltable junction melts to allow the collapse of the spring and break the path of the electric current.

Preferably the circuit protection device is formed as a preassembled grouping of components, and is used for interrupting a sustained moderate overload current.

In another embodiment, the present invention provides in a fuse having an insulating tube sealed by terminals, a conductive spiral spring provided in electrical communication in between the terminals, wherein the current path is along the conductive spring. The spring is secured between each of the terminals in a loaded position by a coupling member, such as a solder joint or a fusible constriction. On a predetermined over current, the coupling member is caused to release the spring to allow its collapse, breaking the current path.

In a further embodiment, the electric fuse of the present invention comprises a tube of non-conducting material. Preferably, separate means for interrupting major fault currents and for interrupting overload currents are serially connected to each other in the tube. The means for interrupting major fault currents includes a fusible element of sheet metal having at least one perforation or point of reduced cross-section. A pulverulent arc-quenching filler is provided inside the tube. The means for interrupting overload currents includes a conductive housing and a plunger, wherein the housing has first and second ends and defines an opening at the first end and a shoulder at the second end. The plunger is arranged inside the housing in a coaxial relation with a spring and projects from the first end, with the outermost end of the plunger connected by a solder joint to an end of the fusible element which is remote from a first one of said terminal caps. The solder joint restrains the plunger from movement through the opening as a result of the plunger being biased away from the first terminal cap by a spiral spring. Preferably, the spiral spring is formed as a coiled spring having a relatively large diameter first end portion and a relatively small diameter second end portion. The coils of the spring are configured so they may be placed in a coplanar configuration, with individual coils nesting interposed between adjacent coils. When unbiased the coils of said spring spread out with said second end portion of the spring extending relative to the first end portion towards the second one of said terminal caps. The spring is preferably reverse loaded in an extended position whereby the second end portion of the spring is pulled axially inwardly past the first end portion, toward the first end cap. The spring is held in the reverse loaded position with first end portion of the spring abutting the shoulder and said second end portion of the spring abutting a flange formed by the plunger.

Accordingly, in one aspect the present invention resides in an electrical interruption device to interrupt current flow therethrough on a predetermined condition occurring, the device comprising, spiral spring means having coils winding continuously about and constantly approaching a central axis, with successive coils having sufficiently reduced radius to pass axially through the center of an immediately outward adjacent coil, the spring means having a first end portion and a second end portion, the spring means having an inherent tendency to assume an unbiased first position, the spring means being axially deformable from the unbiased first position to a second loaded position by drawing said second end portion along the axis relative to said first end portion, holding means for engaging the first and second end portions to retain the spring means in the second loaded position, said holding means comprising coupling means releasably securing the second end portion, wherein on said predetermined condition occurring said coupling means releases said second end portion to permit said spring means to move towards said unbiased first position, said spring means in moving towards said unbiased first position actuating interruption of the current flow.

In another aspect, the present invention resides in an electric fuse comprising a tube of non-conducting material closed at both ends by a pair of terminals; separate means for interrupting major fault currents and means for interrupting overload currents serially connected to each other in said tube; said means for interrupting major fault currents including a fusible element, and said means for interrupting overload currents including, a housing having a first and a second end, and defining a cavity having an opening at the first end, a plunger having an interior end and an exterior end, and spring means, the plunger and spring means axially aligned within said cavity, said spring means comprising a substantially conical spiral spring having coils winding continuously about and constantly approaching a central axis, with successive coils having sufficiently reduced radius to pass axially through the center of an immediately outward adjacent coil, the conical spring having a relatively large diameter first end portion and an axially spaced relatively small diameter second end portion, the conical spring having an inherent tendency to assume an unbiased first position, said conical spring being axially deformable from the unbiased first position to a second reverse loaded position by drawing the second end portion along the axis past the first end portion, said interior end of said plunger secured to the second end of the spring means within the cavity with the exterior end of the plunger projecting out from said first end opening and releasably secured by coupling means with an end of said fusible element in electrical connection therewith, the coupling means comprising a first low temperature solder mass having a predetermined melting temperature, the first solder mass restraining the plunger from movement at temperatures of the solder mass below said predetermined temperature, said conical spring loaded in said second position with said first end portion secured to said housing spaced from the first end opening and said exterior end of the plunger secured to the end of the fusible element, wherein on the coupling means releasing the plunger the spring draws the plunger further into the cavity away from said end of said fusible element a distance sufficient to substantially interrupt the flow of current between said first and second terminal caps.

In a further aspect, the invention resides in an electrical interruption device to interrupt current flow therethrough on a predetermined condition occurring, the device comprising, a plunger, spring means having an inherent tendency to assume an unbiased first position, and being deformable from the unbiased first position to a second loaded position, said spring means engaging said plunger, holding means for releasably securing the spring means in the second loaded position, a sleeve of insulating material disposed about a portion of said plunger, when said spring means is in said second loaded position said plunger permitting current flow, wherein on said predetermined condition occurring said holding means releasing said spring means to permit said spring means to move towards the unbiased position, said spring means in moving towards said unbiased first position moving the plunger relative to said sleeve to a position to actuate interruption of current flow.

In another aspect the invention resides in an electric fuse comprising a tube of non-conducting material closed at both ends by a pair of terminals; separate means for interrupting major fault currents and means for interrupting overload currents serially connected to each other in said tube; said means for interrupting major fault currents including a fusible element, and said means for interrupting overload currents including, a housing having a first and a second end, and defining a cavity having an opening at the first end, a plunger having an interior end and an exterior end, spring means, and a sleeve of insulating material, the plunger and spring means axially aligned within said cavity, the spring means having an inherent tendency to assume an unbiased first position, said spring means being axially deformable from the unbiased first position to a second loaded position, said interior end of said plunger secured by a first end of the spring means within the cavity with the exterior end of the plunger projecting out from said first end opening and releasably secured by coupling means with an end of said fusible element in electrical connection therewith, the sleeve of insulating material disposed about the exterior end of said plunger, the coupling means comprising a first low temperature solder mass having a predetermined melting temperature, the first solder mass restraining the plunger from movement at temperatures of the solder mass below said predetermined temperature, said spring means loaded in said second loaded position with said first end portion engaging said end of said plunger and said exterior end of the plunger secured to the end of the fusible element, wherein on the coupling means releasing the plunger the spring drawing the plunger further into the cavity to retract said exterior end of said plunger into the sleeve away from said end of said fusible element a distance sufficient to substantially interrupt the flow of current between said first and second terminal caps.

BRIEF DESCRIPTION OF THE DRAWINGS

Further objects and advantages of the invention will appear from the following description taken together with the accompanying drawings in which.

DETAILED DESCRIPTION OF THE DRAWINGS

Figure 1:
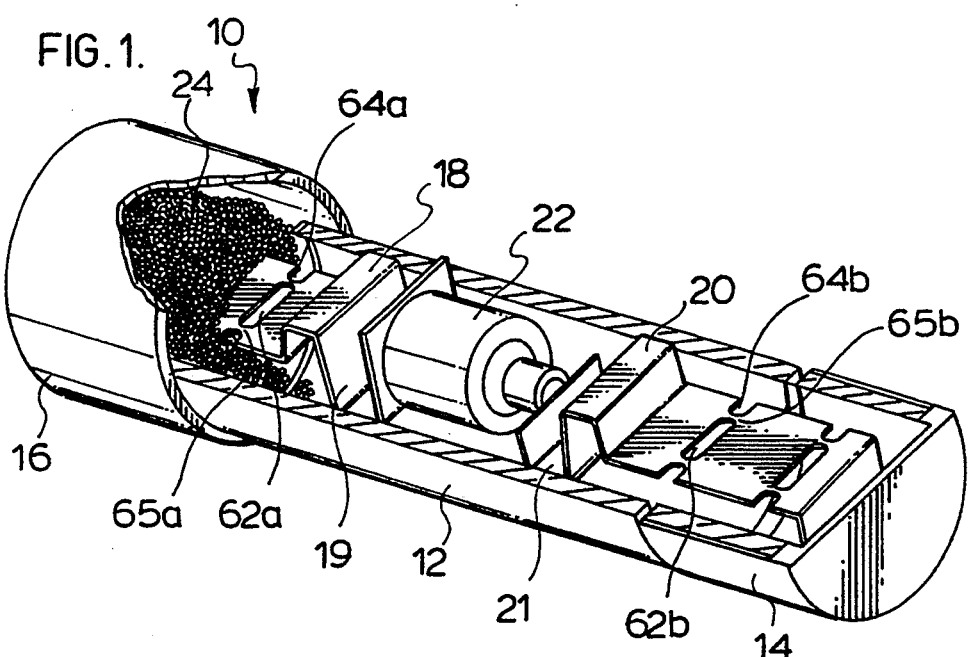
FIG. 1 is a cut-away pictorial view of a dual element fuse according to the present invention.

Reference is now made to FIG. 1, which shows a fuse 10 which includes an electrically insulative tube 12 closed at each end thereof by conductive metal terminal caps 14,16. Housed within the insulative tube 12 are fusible elements 18,20 and an overload protection device or preassembly 22. The fusible elements 18,20 and overload preassembly 22 connected in series, providing a conductive path for electric communication between terminal cap 14 and terminal cap 16.

Pulverulent arc-quenching material 24, such as silica sand with or without a binder or fine calcium sulfate powders, is provided within the tube 12 about the fusible elements 18,20 and overload preassembly 22.

Figure 2:
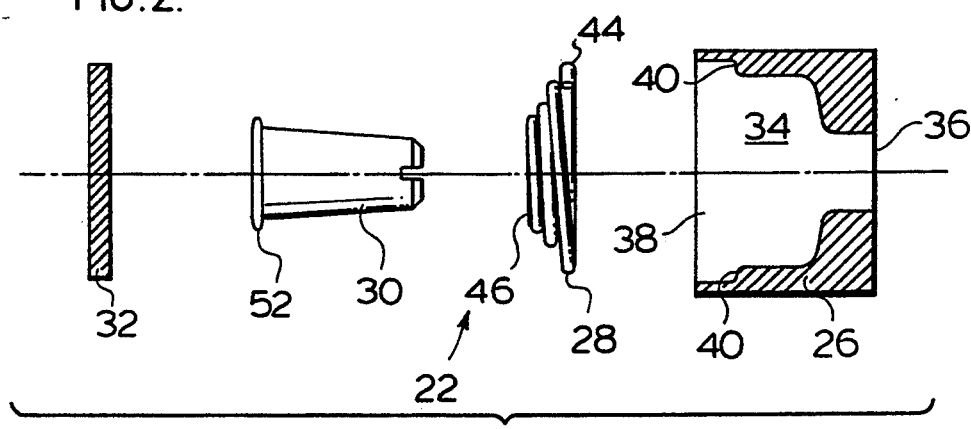
FIG. 2 is an exploded view of a preferred thermally sensitive overload preassembly according to the present invention.

FIG. 2 shows the overload preassembly 22 comprising conductive copper or copper alloy barrel-shaped housing 26, stainless steel spiral coil spring 28, conductive copper or copper alloy plunger 30 and conductive copper back plate 32.

The casing 26 defines a hollow cavity 34 having first and second end openings 36,38. A circumferential shoulder 40 is formed about an inside surface of casing 26, adjacent the second end opening 38.

Figure 5:
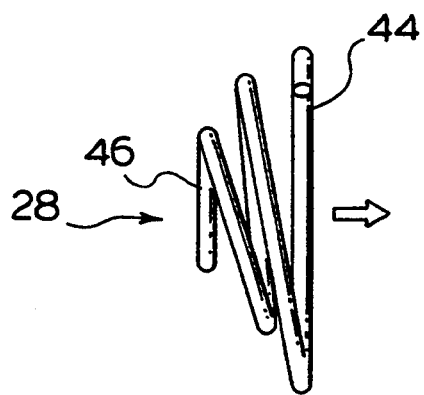
FIG. 5 is a perspective side view of a preferred spring for use with the thermally sensitive overload protection device of FIG. 2.

The coil spring 28 and plunger 30 are axially aligned within cavity 34. FIG. 5 shows the spring 28 in an unbiased position as preferably generally conical in shape, having a relatively large diameter first end portion 44, which spirals inwardly in an arc of continuously decreasing radius to a relatively small diameter second end portion 46.

Figure 6:
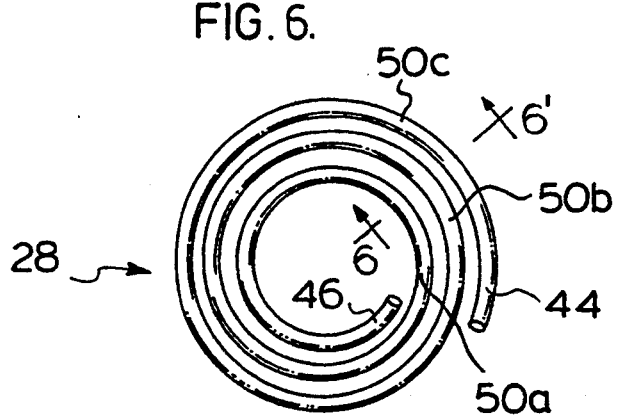
FIG. 6 is a plan view of the spring of FIG. 5 with the coils lying in a coplanar orientation.
Figure 7:
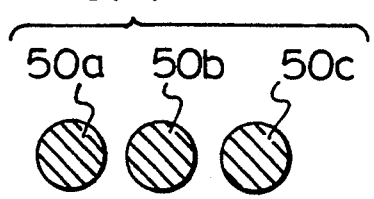
FIG. 7 is a cross-sectional view of the spring of FIG. 6 taken along line 6—6'.

The outer-most diameter of the first end portion 44 is selected small enough to allow insertion of the spring 28 into the cavity 34 through second end opening 38, but large enough to result in the abutting engagement of the end portion 44 against shoulder 40. FIGS. 6 and 7 show the spring 28 in a flattened state, wherein each of the individual coils 50a,50b,50c are configured to lie coplanar. As is apparent, the radius of the coils decreases toward the second end portion 46 in an amount sufficient to allow the nesting of the individual coils 50b between adjacent coils 50a,50c, such that successive inwardly displaced coils 50a,50b have a sufficiently reduced radius to pass axially through the center of an immediately outward adjacent coil 50b,50c, respectively.

The assembly of preassembly 22 may best be described with reference to FIG. 2, which shows the spring in the unbiased position, and FIG. 3 which shows the assembled preassembly 22, with the spring 28 in a tensioned reverse loaded configuration. As seen best in FIG. 2, the unbiased spring 28 is positioned in the cavity 34, with the first end portion 44 abutting shoulder 40, and the second end portion 46 of the spring 28 extending away from the first end opening 36.

The plunger 30 is axially aligned with the spring 28 and inserted into the cavity 34 through the second end opening 38.

On insertion, the plunger 30 is passed through the second end portion 46 of spring 28, with a retaining flange 52 formed on the plunger 30 engaging the coils of second end portion 46. The plunger 30 is pushed from its flange 52 end through the spring 28 to deform the spring 28 to the reverse loaded configuration, wherein the smaller diameter coils of the second end portion 46 are moved inwardly through and past the larger diameter coils of the first end portion 44, so as to extend towards the first end opening 36, as seen in FIG. 3. The spring 28 in the reverse loaded position is under tension and tends to return to its unbiased position.

The length of the plunger 30 is selected such that when received within the cavity 34, the first end of the plunger 30 passes through the spring 28 and extends outwardly through first end opening 36, beyond the housing 26. The plunger 30 preferably tapers marginally outward from its outwardly extending end towards the inner end and flange 52. The sizing of the plunger 30 is selected to permit substantially unhindered movement of the plunger 30 inwardly into the chamber 34, through the opening 36.

Low temperature solder masses 54,56, preferably eutectic solder having a fixed melting point of generally less than 200° C., are applied to the preassembly 22. Solder masses 54,56 act to secure the plunger 30 and casing 26 and the plunger 30 and fusible element 20, respectively, to restrain the plunger 30 from movement further into the chamber 34 and prevent the return of spring 28 toward its unbiased position. If desired, solder mass 54 may be first applied about the plunger 30 to substantially seal the first end opening 36. The provision of solder mass 54 sealing the first end opening 36 is advantageous in that it minimizes the likelihood of the pulverulent material 24 interfering with the sliding of the plunger 30 on activation of the preassembly 22.

As is to be appreciated, the melting temperature of each solder mass 54,56 are selected as predetermined temperatures and preferably are substantially the same.

Back plate 32 is secured over the second end opening 38, preferably initially by crimping, to substantially seal opening 38 and prevent the arc-quenching pulverulent material 24 from entering the cavity 34 therethrough and interfering with the operation of preassembly 22. Later a high temperature solder 58 is provided to further secure the back plate 32 in place. By high temperature solder, it is generally meant that solder mass 58 has a higher melting temperature relative to solder masses 54,56, preferably higher than 200° C.

In assembly, the solder 54 preferably achieves both mechanical and electrical purposes. Mechanically, below its melting temperature solder mass 54 retains spring 28 in the reverse loaded position by restricting movement of plunger 30. Once the melting temperature is reached solder 54 melts in conjunction with solder 56, to permit the return of the spring 28 to an untensioned state. Electrically, the solder mass 54 provides a good electrical connection and current path between the housing 26 and plunger 30.

Figure 3:
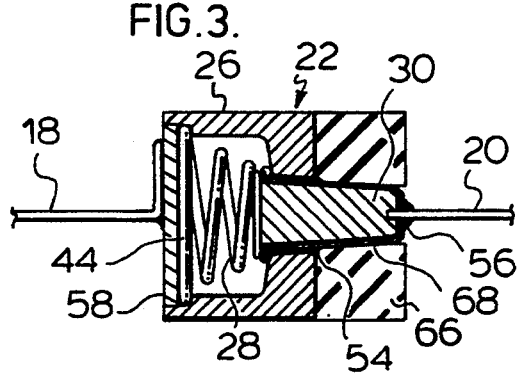
FIG. 3 is a cross-sectional view of a preferred thermally sensitive overload protection device of FIG. 2 when closed.
Figure 4:
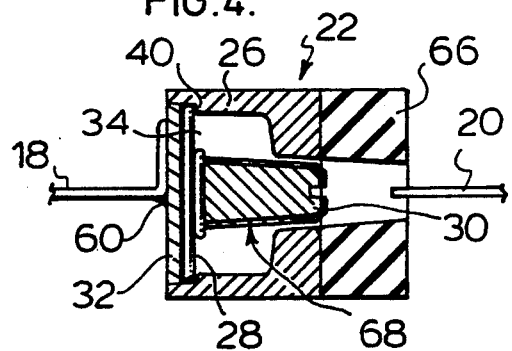
FIG. 4 is a cross-sectional view of a preferred thermally sensitive overload protection device of FIG. 2 when open.

As seen best in FIGS. 3 and 4, the preferred preassembly 22 includes an electrically insulative sleeve, preferably comprised of silicone 66 (organosilicon oxide polymers having the general formula $-R_2Si-O-$; wherein R is a monovalent organic radical) about the portion of the plunger 30, which extends outwardly from the housing 26.

Providing the silicone sleeve 66 is advantageous in that it assists in preventing the pulverulent arc-quenching material 24 from interfering with the smooth sliding of the plunger 30 during the activation of the preassembly 22. The silicone sleeve 66 substantially isolates the movable plunger 30 of the preassembly 22 from the surrounding arc-quenching material 24, eliminating the need to isolate the preassembly 22 in a separate chamber within the fuse 10. The silicone sleeve 66 increases the interruptive capacity of the preassembly 22 to overload currents of a higher amperage. Once the preassembly 22 is activated, the movement of the plunger 30 inwardly into the sleeve 66, as seen in FIG. 4, creates a pressure effect which assists in extinguishing any current arc. The silicone sleeve 66 is further advantageous in that it assists in containing and controlling any arcing of electrical current occurring between the end of the plunger 30 and the adjacent end of fusible element 22, once the preassembly 22 is activated.

FIG. 3 shows best the sleeve 66 extending along the length of, and in contact with, the first end of the plunger 30. The sleeve 66 substantially prevents arc quenching material 24 from locating between the sleeve 66 and the plunger 30. The sleeve 66 completely encircles the first end of the plunger 30, (shown best in FIG. 9). When the plunger 30 is moved into the housing 26 to the position shown in FIG. 4, the first end of the plunger 30 retracts into the sleeve 66, forming a current interrupting gap in the sleeve 66 in the space which the first end of the plunger 30 previously occupied.

Preferably the plunger 30 is provided with a thin electrically conductive lubricating coating, such as tin plating 68. The tin plating 68 is provided about the first end of the plunger 30 adjacent the sleeve 66. The tin plating 68 plasticizes upon heating of the plunger 30 during overload conditions to minimize the extent the silicone sleeve 66 adheres to the plunger 30 and interferes with its sliding movement. The plasticizing of the tin plating also assists in lubricating the plunger 30, easing its sliding movement through opening 36. It is to be appreciated that in addition to tin plating 68, the lubricating coating may also comprise other conductive metals, as for example tin alloys or bismuth alloys.

The silicone sleeve 66 may be preformed and applied in assembly or molded directly about the preassembly and its plunger 30.

It is possible to form the plunger 30 and/or the housing 26 from an alloy which exhibits a shape memory effect, as for example are disclosed in L. M. Schetky: "Shape-Memory Alloys"; SCI. Amer., 241, No. 5, 1979, pp. 74–82, C. M. Wayman: "Some Applications of Shape Memory Alloys"; J. Metals, 32, No. 6, 1980, pp. 129–137, and C. M. Wayman: "The Shape Memory Effect"; Metals Forum, 4, No. 3, 1981, pp. 135–141. A metal exhibiting a shape memory effect is generally characterized as a metal which may be heated plastically deformed at one temperature to a stressed configuration, as for example under tension, compression or torsion and when heated through a temperature range As (Austenite start temperature) to Af (Austenite finish temperature), the metal substantially returns to its original undeformed state. More specifically, the shape memory effect process involves a reversible martensitic phase transformation. At temperatures above As, the martensite is converted to to a high temperature phase (Austinite) and the modulus of elasticity increases (ie. the reverse of ordinary metals). The increase in the modulus of elasticity gives the shape memory effect alloys the ability to develop a greater tensile or torsional force with an increase in temperature. The increase in tensile or torsional forces may be either static in the case of the plunger returning to its undeformed state or it may be used to produce a desired controlled motion within the fuse.

As such with a shape memory effect alloy, the plunger 30 may comprise a shape memory effect alloy which is deformed to an expanded shape. On the occurence of an elevated temperature above As as a result of a sustained overload condition, the alloy shrinks or changes shape to an undeformed state to facilitate sliding movement of the plunger 30 from the sleeve 66 through the opening 36. As is to be appreciated, the shrinkage of the plunger 30 further acts to minimize its interference with the sleeve 66 and the housing 26 as the plunger 30 moves.

In another embodiment, both the plunger 30 and the housing 26 are formed from shape memory effect alloys. In a deformed state the housing 26 may be configured to tightly engage the plunger 30 where it passes through opening 36. Such configuration may advantageously eliminate the requirement of first applying solder mass 54 to seal the first end opening 36. On the occurance of an elevated temperature above As as the result of a sustained overload current condition, the plunger 30 may shrink or change shape and the housing 26 may expand or change shape to undeformed states, further facilitating sliding movement of the plunger 30 on activation of the preassembly 22.

As will be apparent, suitable shape memory effect alloys include but are not limited to, copper alloys such as Cu-Zn, Cu-Zn-Al, Cu-Zn-Ga, and Cu-Zn-Ni. Such memory effect alloys may be either used in conjunction with or in place of a lubricating coating.

The overload preassembly 22 is connected within fuse 10 in series between fusible elements 18 and 20. Low temperature solder mass 56 connects the fusible element 20 to the end of plunger 30. Fusible element 18 is secured in electrical connection with back plate 32 by means of high temperature solder junction 60. Preferably, back plate 32 may be tin plated as is known to assist in soldering such that in assembly the application of high temperature solder 58 and 60 is optimally accomplished in a single operation.

As seen in FIG. 1, each of fusible elements 18 and 20 comprise a flat ribbon of conductive copper. Each fusible element 18,20 comprises in effect three portions, a first castellated insulating fold portion adjacent the preassembly 22, a second flat central fusible portion and a third terminal portion adjacent each terminal cap. The central fusible portion is shown as planar and having at spaced locations therethrough, respective apertures 62a,62b and points of reduced cross-sectional area 64a,64b which define one or more narrow constrictions 65a,65b. The third terminal portion of each fusible element 18,20 is bent, and while not shown, may be reduced in width to be secured to a respective terminal cap 16,14 in known manner.

The first insulating fold portion of each fusible element 18,20 is secured directly to the preassembly 22 and is formed by insulating folds 19,21. Each of the insulating folds 19,21 comprise a portion of respective fusible elements 18,20 which contain no constrictions. As shown in FIG. 1, the insulating fold portions comprise a portion of a conductive element which has been folded into a full castellated cycle for compaction. Insulating folds 19,21 partially absorb and dissipate heat generated by short term overload current flow through adjacent constrictions 65, to minimize the likelihood of premature activation of the preassembly 22. On a sustained low overload current, insulating fold portions transfer heat and warm the preassembly 22 assisting in its operation.

In operation, short circuit conditions producing high over currents cause the fusible elements 18,20 to immediately heat to the melting point in the area of the constrictions 65a,65b. The high over current passing through the fusible elements 18,20, causes rapid heating and melting at the constrictions 65a,65b, resulting in the immediate circuit interruption by the fuse 10. The arc-quenching pulverulent material 24 minimizes current arcing and assists in maintaining a break in the path of electric current flow between terminal caps 14 and 16.

The operation of the preassembly 22 may best be described with reference to FIGS. 3 and 4 which show the preassembly 22 secured in between the two fusible elements 18,20, which are fixed in position relative thereto.

The resistance and thermal mass of the preassembly 22, combined with the melting temperature of the solder masses 54,56, is selected such that the preassembly 22 will activate only after a sustained moderate overload current condition. Current flowing through the overload preassembly 22 and elements 18,20, on a sustained overload current combines with the thermal mass of the housing 26 and plunger 30 to gradually raise the temperature therein. The increase in temperature in the preassembly 22 results in the tin plating 68 on the plunger 30 plasticizing, thereby reducing the adherence of the silicone sleeve 66 to the plunger 30. When the overload current occurs for a time which is sufficient to raise the preassembly 22 temperature to that where the solder masses 54,56 melt, the plunger 30 is released.

As seen in FIG. 4, once released, the plunger 30 is drawn by the spring 28 away from fusible element 20 further inwardly into the cavity 34 and the silicone sleeve 66. The plunger 30 is moved away from the fixed fusible element 20 a distance sufficient to break the flow of electric current therebetween. The extended end of the plunger 30 becomes retracted within the silicone sleeve 66, as is advantageous to assist in extinguishing and controlling arcing.

By providing a reverse loaded conical spring 28, the release of the plunger 30 causes the coils of the spring 28 to collapse inwardly into a substantially flat orientation against the back plate 32, with the plunger 30 moved therewith, so that the inward end of plunger 30 is biased against the back plate 32. As is to be appreciated, providing a spring 28 which tends to orient itself substantially flat against the back plate 32 is advantageous over conventional springs in that it enables the movement of the plunger 30 a sufficient distance from conductive element 20 to break the circuit, while minimizing the required axial length of the housing 26.

Figure 8:
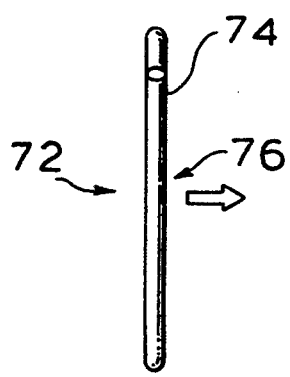
FIG. 8 is a perspective side view of a further spring for use with the thermally sensitive overload protection device of FIG. 2.

While the provision of reverse loaded conical spring 28 is advantageous in that it places substantially the same force on the plunger 30 as a conventional compressed or extended helical spring having almost twice the length, it is not essential. FIG. 8 shows a second spiral coil spring 72 for use with the present invention and which comprises a large diameter first end portion 74 which spirals inwardly into a relatively smaller diameter second end portion 76. The coils of spring 72 gradually decrease in radius from the first end portion 74 to the second end portion 76. When unbiased, the individual coils of the spring 72 nest, lying flat and coplanar, in substantially the same configuration as the flattened spring 28 shown in FIGS. 6 and 7.

Spring 72 is inserted into the preassembly casing 32 in substantially the same manner as spring 28 with the first end portion 74 abutting shoulder 40 and the second end portion 76 secured in abutting relationship with the flange 52 of the plunger 30. The insertion of the plunger 30 into the cavity 34, projecting through opening 36 extends the second end portion 76 under tension towards the first end opening 36.

On activation of the preassembly 22, the spring 72, with plunger 30, tends to return to an unbiased position, fully collapsed with the coils of first and second end portions 74,76 lying in the same plane with each other and with the annular shoulder 40.

Figure 9:
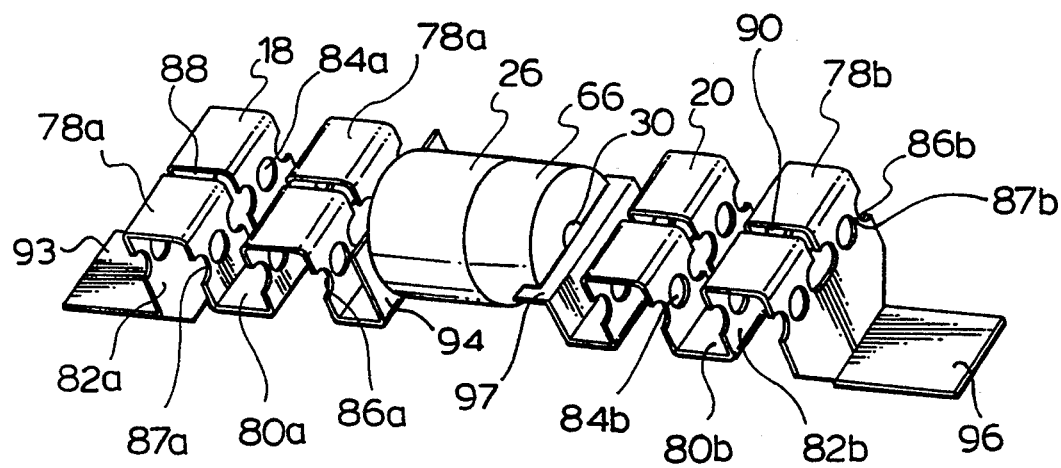
FIGS. 9 and 10 are partial perspective views of preferred thermally sensitive overload protection devices in series communication with electric conductive elements for short circuit protection, for use in the fuse of FIG. 1.
Figure 10:
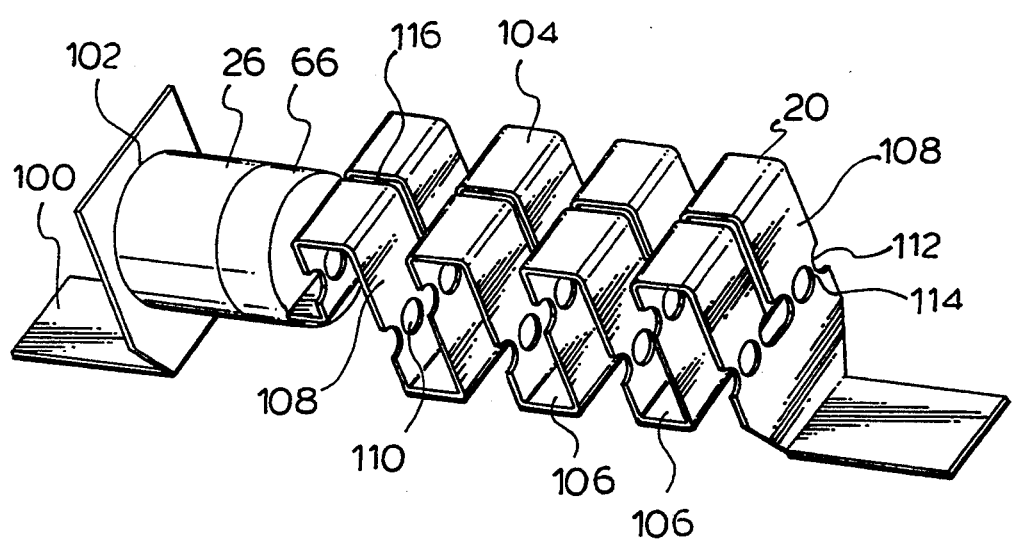

Reference may now be had to FIGS. 9 and 10 which show two preferred fusible element/overload preassembly configurations, wherein equivalent reference numerals are used to designate equivalent components. In each of the embodiments shown in FIGS. 9 and 10, the overload preassembly 22 is provided with an insulating silicone sleeve 66, and is identical to that shown in FIG. 3.

In FIG. 9, each of the fusible elements 18 and 20 comprise a flat strip of copper which has been folded in a castellated manner for compaction. Fusible elements 18,20 have respective flat top portions 78a,78b, flat valley portions 80a,80b, and flat side portions 82a,82b. Each flat side portion 82 extends perpendicular to and connects adjacent top and valley portions 78,80.

A number of equally spaced apertures 84a,84b and points of reduced cross-section 86a,86b define constrictions 87a,87b in each respective fusible element 18,20. Each fusible element 18,20 is further pierced by a respective longitudinally extending medial slot 88,90.

As with constrictions 65a,65b, constrictions 87a,87b have very small diameter cross-sections in which the current densities can be quite high. As long as current flowing through fusible elements 18,20 is less than the rating for each element 18,20, the constrictions 87a,87b will remain intact. Slit 88 divides fusible element 18 into two preferably equal conductive parallel paths in electrically parallel relation, each having one or more constrictions. Slit 90 similarly divides element 20 into electrically parallel conductive paths. The provision of two parallel paths in each element 18,20 allows for dynamic current transfer from one parallel path to the other during extremely high overload operation. The provision of a slit is optionally provided to lower the level of over-current required to melt a constriction 65 sufficiently such that there is overlap between the upper level of overload current, which is interrupted by the preassembly 22 and the lower level of over-current required to activate fusible elements 18,20.

Terminal folds 93,96 are provided in fusible element 18 20, adjacent respective terminal caps 16,14. Terminal folds 93,96 preferably have reduced width and are devoid of apertures, points of reduced cross-section or slits.

Insulating folds 94,97 are provided in fusible elements 18,20 adjacent preassembly 22. The insulating folds 94,97 comprise a portion of a castellated fold cycle and are devoid of apertures, fusible constrictions or slits.

The insulating folds 94,97 act to partially absorb and dissipate heat generated by the electric current flow through constrictions 87, reducing the likelihood of premature activation of the preassembly 22.

In the embodiment shown in FIG. 10, a conductive copper element 100 has been substituted for fusible element 18 and is secured to the overload preassembly by high temperature solder 102. Fusible element 20 is folded in a castellated manner having a similar configuration to that shown in FIG. 9 having flat top portions 104, flat valley portions 106 and flat side portions 108. Parallel spaced pairs of apertures 110 and adjacent pairs of points of reduced cross-sectional area 112 define restriction 114 in each of side portions 108. Each one of the pairs of apertures 110 is separated by an elongate medial slit 116 extending longitudinally through fusible element 20.

The constrictions 114 act in substantially the same manner as constriction 87 shown in FIG. 9, and are identical but for the constrictions 114 of each side portion 108 being laterally offset with respect to adjacent constrictions 114 in adjacent side portions 108. With constrictions 87 aligned, as seen in FIG. 9, it is possible that an electric current may arc in a straight line along the axis of the fuse. Providing constrictions 114 which are out of alignment with respect to adjacent constrictions 114 is advantageous in that it reduces the likelihood of straight line arcing and maximizes the segregation of separate current arc locations between side portions 108, after the constrictions 114 have melted. Maximizing the distance between adjacent constrictions 114 is advantageous in that it reduces the likelihood of current arcing between adjacent side portions 108.

While the embodiment discloses the use of the spiral coil spring in a preassembly, it is to be appreciated that the invention is not so limited. Other configurations of fuses incorporating the disclosed spiral spring as a means of interrupting electric current flow will now become apparent.

Although the preferred embodiment has been shown as comprising an overload preassembly connected in series with fusible elements within a tube, it is to be appreciated that the preassembly is not so limited and may equally be used in any device where sustained overload current protection is desired.

Similarly, the preferred overload preassembly and fusible elements are disclosed as comprising copper, however, other metals and conductive materials such as alloys of copper and silver may equally be used.

The use of castellated fusible elements formed from a ribbon of metal is advantageous in that it permits the premanufacture of a compact preassembly/fusible element preformed unit, which may then be used in achieving a simplified fuse manufacture. It is to be appreciated, however, that the invention is not so limited, and other fusible elements, such as flat metal ribbons having restrictions, metal ribbons having insulating folds or fusible wires, may also be used.

The preferred embodiment of the invention discloses a fuse for use with moderately high or high electric currents. Persons skilled in this art will appreciate that where the preassembly is to be used in conjunction with low amperage fuses, the thermally sensitive preassembly may be provided with a heating device. A preferred heating device comprises an electrically insulated heater wire wound about the preassembly housing and electrically connected in series with the current flowing through the fuse.

The present invention illustrates in FIG. 2 a preassembly which may advantageously be manufactured as a preformed component either with or without the silicone sleeve shown in FIG. 3. With plunger 30 retained in by solder 54, the preassembly without fusible elements 18 and 20 may be premanufactured to a modular component for storage and later used in fuses as desired. A more complex modular component may also be premanufactured comprising, for example, the preassembly of FIG. 2 with elements 18 and 20 secured thereto. The modular component comprising the preassembly and elements 18 and 20, may be stored ready for use in insertion as a whole unit in final assembly of a fuse. The fact that the preassembly is a sealed unit greatly facilitates fuse manufacture when arc-quenching material 14 is to be provided in the fuse.

With the preassembly forming a modular unit which may be readily mass manufactured, the preassembly can comprise a basic component for a progressive series of fuses of different ratings by incorporating different components, such as different elements 18 and 20 with each preassembly. Moreover, more than one modular component comprising a preassembly and elements 18 and 20 may be provided in parallel in a single fuse.

The preferred embodiments of the fuses illustrated in FIGS. 1, 9 and 10 each use the preassembly of FIG. 2 in which in a closed fuse, the current flow is not along the spring 28. Rather, current flow as for example with the fuse 10 of FIG. 1 is sequentially via element 18, solder mass 60, back plate 32, solder mass 58, casing 26, solder mass 54, plunger 30, solder mass 56 and element 20. The spring 28 operates to interrupt the current by acting on plunger 30. Similar such springs may in other embodiments act differently to activate current interruption. For example, in a simpler fuse the current could pass along a reverse loaded conical spring tensioned between two terminals and joined to one terminal by a solder mass. On the solder mass heating, the spring, by its collapse would interrupt the current. Other configurations for advantageous use of such a conical spring will occur to persons skilled in the art.

While the embodiments of the invention disclose the use of shape memory effect alloys with the preferred preassembly 22 shown in FIGS. 3 and 4, it is to be appreciated that the invention is not so limited. Shape memory effect alloys may equally be incorporated in fuse preassemblies having different configurations. Further, shape memory effect alloys may also be used to form individual components of the fuse, such as fusible elements, or other preassembly components, such as springs.

Although the disclosure describes and illustrates preferred embodiments of the invention, it is not limited to these particular embodiments. Many variations and modifications will now occur to those skilled in the art. For a definition of the invention reference is made to the appended claims.

What we claim:

1. An electrical interruption device to interrupt current flow therethrough on a predetermined condition occurring, the device comprising,
   a plunger,
   said plunger including lubrication means,
   spring means having an inherent tendency to assume an unbiased first position, and being deformable from the unbiased first position to a second loaded position,
   said spring means engaging said plunger,
   holding means for releasably securing the spring means in the second loaded position,
   a sleeve of insulating material disposed about and in contact with a portion of said plunger,
   said lubrication means adjacent said sleeve,
   when said spring means is in said second loaded position said plunger permitting current flow, wherein on said predetermined condition occurring said holding means releasing said spring means to permit said spring means to move towards the unbiased position, said spring means in moving towards said unbiased first position moving the plunger relative to said sleeve to a position to actuate interruption of current flow.

2. An electrical interruption device as claimed in claim 1 wherein on movement of the spring means to the first position the plunger is withdrawn from the sleeve forming a current interrupting gap in said sleeve in the space which the plunger previously occupied.

3. An electrical interruption device as claimed in claim 1 wherein the sleeve is disposed about an end portion of the plunger, wherein on movement of the spring means to the first position the end portion of the plunger is retracted into said sleeve forming a current interrupting gap in said sleeve in the space which the plunger previously occupied.

4. An electrical interruption device as claimed in claim 3 wherein said plunger is elongated, said sleeve completely encircling said end portion, and
   said current flow is along said plunger through said sleeve.

5. An electrical interruption device as claimed in claim 4 wherein said lubrication means comprises a coating of tin or tin alloy.

6. An electrical interruption device as claimed in claim 5 wherein said sleeve of insulating material comprises silicone.

7. An electrical interruption device as claimed in claim 1 further comprising
   housing means having an opening, and
   pulverulent arc quenching material,
   when the spring means is in the second loaded position said plunger having a first end projecting out of the housing means through said opening, wherein in moving towards said unbiased first position said spring means moves said first end of said plunger to return through said opening,
   said arc quenching material disposed outside the housing means,
   said sleeve disposed outside the housing means about the first end of the plunger adjacent the opening, the sleeve isolating the arc quenching material from the plunger where it passes through the opening.

8. An electrical interruption device as claimed in claim 7, wherein
   the spring means engages another second end of the plunger,
   the housing means substantially isolating said pulverulent arc quenching material from the spring means and the second end of the plunger, and
   the holding means comprises a first low temperature solder mass having a predetermined melting temperature, said first solder mass restraining the plunger from returning through said opening at temperatures of the solder mass below said predetermined melting temperature.

9. An electrical interruption device as claimed in claim 8, wherein said sleeve encircles the whole of the first end of said plunger which extends through the opening, on movement of the spring means towards the first position the plunger is retracted into the sleeve forming a current interrupting gap in the sleeve in the space which the plunger previously occupied.

10. An electrical interruption device as claimed in claim 9 wherein said sleeve is provided in contact with said plunger substantially preventing said arc quenching material from assuming a location therebetween.

11. An electrical interruption device as claimed in claim 10 wherein said lubrication means comprises a coating of tin or tin alloy.

12. An electrical interruption device as claimed in claim 11, wherein said sleeve of insulating material comprises silicone.

13. An electrical interruption device as claimed in claim 12, wherein said first temperature solder mass is disposed about said plunger where it passes through the opening to substantially seal said opening.

14. An electrical interruption device as claimed in claim 13, wherein said housing and said plunger comprise copper or copper alloy.

15. An electrical interruption device as claimed in claim 12 wherein said plunger is elongated, said current flow is along said plunger through said sleeve.

16. An electric fuse comprising a tube of non-conducting material closed at both ends by a pair of terminals; separate means for interrupting major fault currents and means for interrupting overload currents serially connected to each other in said tube; said means for interrupting major fault currents including a fusible element, and said means for interrupting overload currents including,
a housing having a first and a second end, and defining a cavity having an opening at the first end,
a plunger having an interior end and an exterior end,
spring means, and
a sleeve of insulating material,
the plunger and spring means axially aligned within said cavity,
the spring means having an inherent tendency to assume an unbiased first position, said spring means being axially deformable from the unbiased first position to a second loaded position,
said interior end of said plunger secured by a first end of the spring means within the cavity with the exterior end of the plunger projecting out from said first end opening and releasably secured by coupling means with an end of said fusible element in electrical connection therewith,
the sleeve of insulating material disposed about the exterior end of said plunger,
the coupling means comprising a first low temperature solder mass having a predetermined melting temperature, the first solder mass restraining the plunger from movement at temperatures of the solder mass below said predetermined temperature,
said spring means loaded in said second loaded position with said first end portion engaging said end of said plunger and said exterior end of the plunger secured to the end of the fusible element, wherein on the coupling means releasing the plunger the spring drawing the plunger further into the cavity to retract said exterior end of said plunger into the sleeve away from said end of said fusible element a distance sufficient to substantially interrupt the flow of current between said first and second terminal caps.

17. An electric fuse as claimed in claim 16 further comprising pulverulent arc quenching material about said means for interrupting overload currents,
said sleeve comprising a continuous tube disposed adjacent said first end of said housing, wherein said sleeve substantially isolates the arc quenching material from the plunger where it passes through said first end opening.

18. An electric fuse as claimed in claim 17, wherein said sleeve is provided in abutting contact with said plunger, said plunger further comprising lubrication means about said exterior end of said plunger adjacent said sleeve.

19. An electric fuse as claimed in claim 18, wherein said lubrication means comprises a coating selected from the group consisting of tin, tin alloys and bismuth alloys.

20. An electric fuse as claimed in claim 19, wherein said sleeve encircles and extends substantially along the whole of said exterior end of said plunger.

21. An electrical interruption device as claimed in claim 20, wherein said sleeve of insulating material comprises silicone.

22. An electric fuse as claimed in claim 18, wherein said plunger is elongated and said current flow is along said plunger,
the retraction of said exterior end of said plunger into the sleeve forming a current interrupting gap in said sleeve in the space which the plunger previously occupied.

23. An electric fuse as claimed in claim 18, wherein said housing and said plunger comprise copper or copper alloy.

24. An electric fuse as claimed in claim 23, wherein said fusible element electrically connects said first one of said terminals and said overload protection means, said fusible element comprising an elongate planar ribbon having at least one point of reduced cross-section.

25. An electric fuse as claimed in claim 24, wherein said fusible element comprises an elongate medial slit.

26. An electric fuse as claimed in claim 24, wherein said fusible element is folded in a substantially castellated manner having flat top portions, flat valley portions and flat side portions, said side portions extending generally perpendicular to and joining adjacent top and side portions.

27. An electric fuse as claimed in claim 20, wherein the exterior end of said plunger tapers inwardly away from said first end opening.

28. An electrical interruption device as claimed in claim 21, wherein said silicone is molded directly about said plunger.

29. An electrical interruption device as claimed in claim 1 wherein said plunger comprises a shape memory effect alloy.

30. An electric fuse as claimed in claim 16 wherein said plunger comprises a shape memory effect alloy.

31. An electric fuse as claimed in claim 16 wherein said housing comprises a shape memory effect alloy.

32. An electrical interruption device to interrupt current flow therethrough on a predetermined condition occurring, the device comprising,
a plunger,
housing means having an opening,
pulverulent arc quenching material, spring means having an inherent tendency to assume an unbiased first position, and being deformable from the unbiased first position to a second loaded position, said spring means engaging said plunger, holding means for releasably securing the spring means in the second loaded position, a sleeve of insulating material disposed about a portion of said plunger, when said spring means is in said second loaded position said plunger permitting current flow and said plunger having a first end projecting out of the housing means through said opening, on said predetermined condition occurring said holding means releasing said spring means to permit said spring means to move towards the unbiased first position, said spring means in moving towards said unbiased first position moving the plunger relative to said sleeve to a position to actuate interruption of current flow, wherein in said plunger moving to a position to actuate interruption of current flow said first end of said plunger moves to return through said opening, said arc quenching material disposed outside the housing means, said sleeve disposed outside the housing means about the first end of the plunger adjacent the opening, the sleeve isolating the arc quenching material from the plunger where it passes through the opening.

33. An electrical interruption device as claimed in claim 1 wherein said lubrication means comprises a coating on said portion of said plunger.

* * * * *